No. 636,136. Patented Oct. 31, 1899.
L. L. GROSS.
VACUUM TANK AND WATER LIFTER.
(Application filed Mar. 24, 1899.)
(No Model.) 2 Sheets—Sheet 1.

Witnesses,

Inventor
Ludwig L. Gross
By Dewey Strong & Co.
Attys

No. 636,136. Patented Oct. 31, 1899.
L. L. GROSS.
VACUUM TANK AND WATER LIFTER.
(Application filed Mar. 24, 1899.)

(No Model.) 2 Sheets—Sheet 2.

Witnesses,
Inventor
Ludwig L. Gross
By Dewey Strong & Co.
Attys

THE NORRIS PETERS CO., PHOTO-LITHO., WASHINGTON, D. C.

UNITED STATES PATENT OFFICE.

LUDWIG L. GROSS, OF PETALUMA, CALIFORNIA.

VACUUM-TANK AND WATER-LIFTER.

SPECIFICATION forming part of Letters Patent No. 636,136, dated October 31, 1899.

Application filed March 24, 1899. Serial No. 710,341. (No model.)

*To all whom it may concern:*

Be it known that I, LUDWIG L. GROSS, a citizen of the United States, residing at Petaluma, county of Sonoma, State of California, have invented an Improvement in Vacuum-Tanks and Water-Lifters; and I hereby declare the following to be a full, clear, and exact description of the same.

My invention relates to an apparatus which is designed for the purpose of filling tanks with water or other liquid or semiliquid, which can be drawn into the tank by vacuum, and to a means for producing a vacuum within the tank.

It also comprises details of construction, which will be more fully explained by reference to the accompanying drawings, in which—

Figure 1:
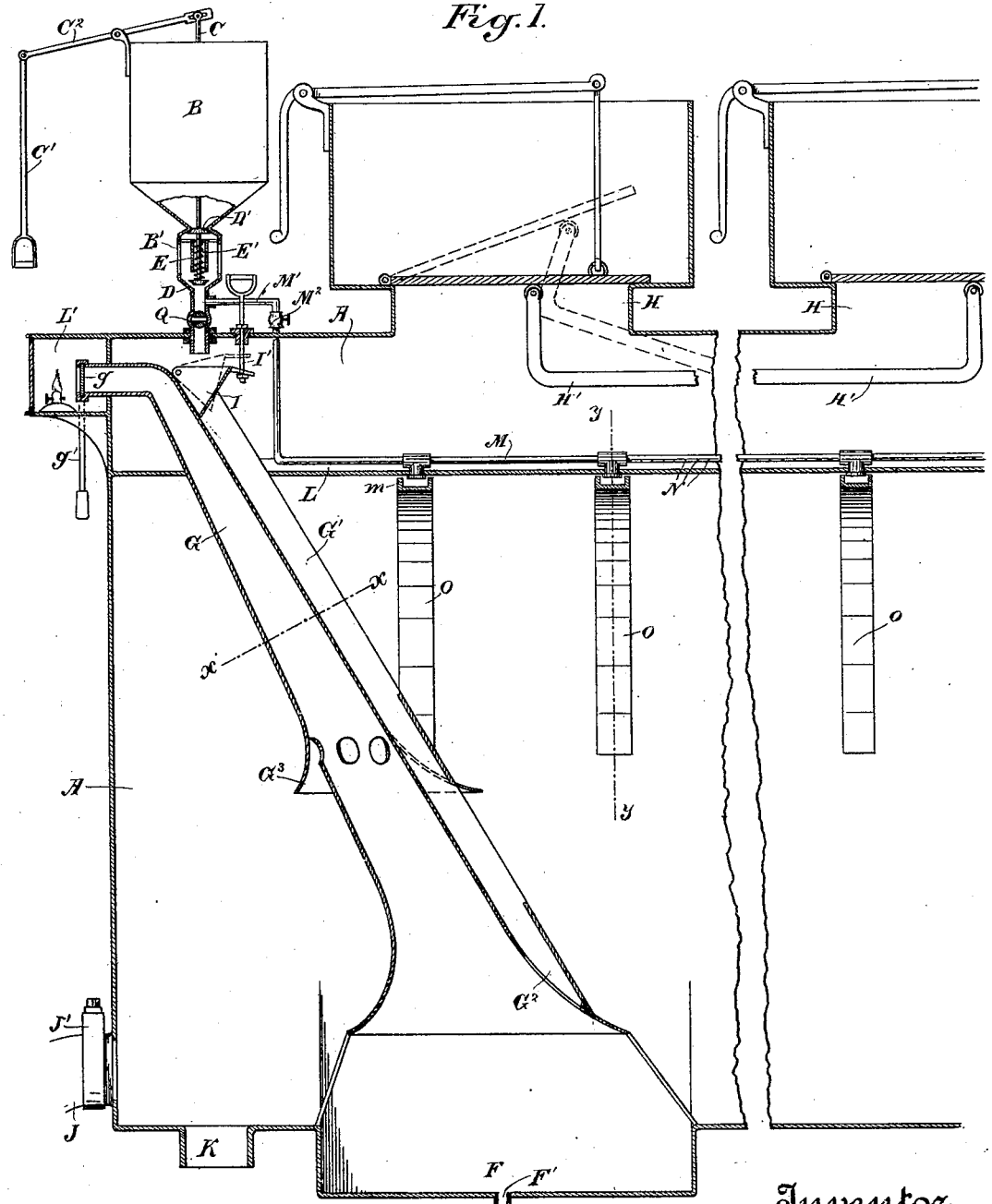
Figure 2:
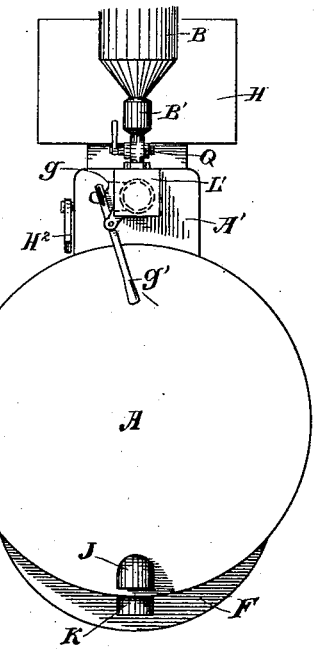
Figure 5:
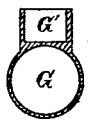
Figure 3:
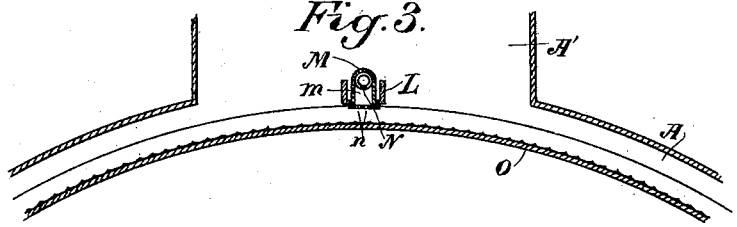
Figure 4:
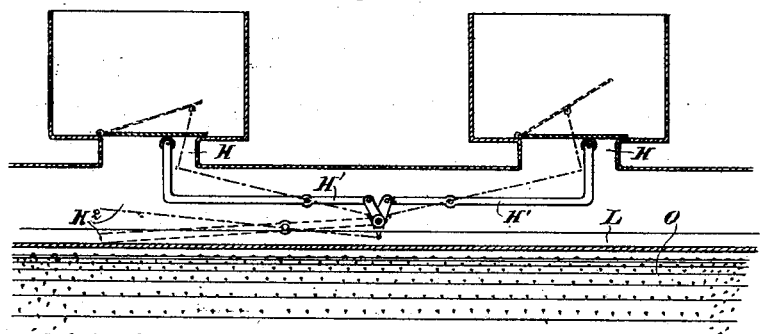

Figure 1 is a longitudinal vertical section through the tank. Fig. 2 is an external rear view of the same. Fig. 3 is a detail section on line $yy$ of Fig. 1. Fig. 4 shows the mechanism to operate the air-valves. Fig. 5 is a detail section on line $xx$ of Fig. 1.

The tank A may be made of any suitable form and of material, such as sheet metal, which will sufficiently resist the explosive effects to be produced within it. Upon the top of the tank are large openings H, with inwardly-closing valves which are normally closed, but which may be opened by the force of the explosion to allow the escape of the gases produced thereby, or, as herein shown, they may be simultaneously opened by means of levers H', connected by links with a hand-lever $H^2$ exterior to the tank. The ends of the levers H' are upturned beneath the valves H and have antifriction-rollers in them to contact and move easily when the valves are opened immediately after an explosion. These valves close immediately afterward, so that the subsequent contraction and the absorption of the gases in the tank will produce a vacuum, and this acts to draw water into the tank through an inlet-passage J, having a controlling valve or gate J'.

K is a discharge-passage through which the contents of the tank may be discharged whenever needed or desired. In the lower part of the tank is formed a supplemental and preferably depressed chamber F, which is lower than the main portion of the tank and is adapted to contain a body of water sufficient for the purpose of producing the gas when necessary. By employing this depressed chamber the water in the main chamber will drain into it, and the main portion of the chamber will ordinarily be dry and not subject to corrosion, which would occur if the water were left to stand in it all the time. This chamber F can also be cleared of water whenever desired by means of a discharge-pipe F' with a suitable controlling-cock.

Any suitable substance may be employed for producing the explosive gas, either some form of liquid hydrocarbon or carbid of calcium or other gas-producing substance. My apparatus is designed to use either of these materials.

In order to supply the material to the tank in suitable charges, I have shown a receiver B, a measuring-chamber B', into which the receiver discharges, with suitable valves, which are operated as follows: A rod or stem C passes centrally and vertically down through the two chambers and has fixed upon its lower end a downwardly-closing valve D, which fits a seat in the bottom of the chamber B', and an upwardly-closing valve D', which closes against the seat in the upper part of the chamber B' when the valve D is opened. The valves are so situated that when one valve is opened the other will be closed. A tube E of larger diameter surrounds the stem C where it passes through the chamber B' and is suitably supported by arms or braces within the chamber. Within this tube is a spring E', surrounding the valve-stem, the upper end pressing against a fixture at the upper part of the tube and the lower end pressing against the valve D and acting to normally close it upon its seat. In this position the material to be measured being placed in the receiver B will pass down into the chamber B' because the upper valve D' is opened. The lower part of this valve closes the upper part of the tube E, if it does not have a closed top, and diverges the falling material into the chamber around the tube, the valve D preventing its escape from the chamber. When it is desired to introduce a charge of the material into the tank A, it is done by pulling upon a cord, or, as herein shown, by pushing up a connection C', the upper end of which is connected with a lever C², fulcrumed upon the receiver B, and the end of this lever is connected with the rod or stem C, so that when the lever C² is moved the valve D' will be closed against the bottom of the receiver B and the valve D will be opened to allow material to flow through it and through a tube which discharges into the upper part of a supplemental chamber A', which extends from end to end of the tank, forming a supplemental drum.

Beneath the end of the discharge-pipe is the upper end of an inclined tube G, the lower end of which is made flaring or divergent just above the depressed chamber F of the tank. Upon the top of this inclined tube is a channel G', which extends all the way from the top to the divergent bottom, and in line with the bottom of this channel is an opening G², which allows the material flowing down the channel to pass into the interior of the funnel-shaped bottom of the tube, and falls thence into the chamber F. To the upper part of the channel G' is hinged or fulcrumed a triangular cup I, having the top open and the sides which fit against the bottom of the channel G' also open. This triangular cup normally stands with its lower edge resting against the bottom of the channel G', and the material discharged from the measuring-chamber B' falls into the cup and is there held until the cup is tilted about its pivot-point by means of a stem I', extending up through the top of the tank and having a handle by which it can be moved or tilted so as to raise the lower angle from its contact with the bottom of the trough, and thus allow the material to slide down the trough and eventually fall into the tank F. The upper end of the tube G is bent into an approximately horizontal position after passing through the bottom of the upper chamber A', and the end of the tube opens into a chamber L, within which is contained the source of heat for producing the explosion. This may be an electric spark, an explosive cap or primer, or a lamp, which I have shown in the present case to illustrate any form of device which will produce the explosion. The end of the tube G is closed by a sliding valve g, and this is connected with a hinged lever g', having a handle by which it may be moved to open this valve. When the solid carbid or other gas-producing substance drops into the water-chamber F, the gas produced will rise and a large portion of it will spread out through the main tank A; but a considerable portion will also rise up through the funnel-mouth and pass up the tube G. At a point intermediate of the length of the tube G is a second funnel G³, diverging downwardly and through the sides of the tube. This second funnel is for the purpose of producing a second explosion, as the first explosion only fills the tank to a certain distance, and this second funnel then discharges above the surface of the water which has been drawn in, so that by a second explosion the remainder of the tank may be filled. As many of the supplemental discharge-funnels may be employed as the size of the tanks makes necessary. The column of gas rising up through the tube G is allowed to pass through the gate or valve g into the ignition-chamber L', and when ignited the explosion is communicated through the whole of the chamber A.

In some cases where a liquid hydrocarbon or other similar material for producing an explosive gas or vapor is used I have shown a means for distributing it so as to fill the whole of the chamber with the gas, which consists of a trough L, extending along through the upper chamber A', and also a tube M, extending centrally through the trough. This tube has couplings at intervals, with branches m extending through the bottom of the trough, and having diverging openings or holes n in the cap at the lower end, through which the material may flow. Beneath each of these tubes m are the transversely-arched troughs O, having the bottom roughened or corrugated, as shown, so that the material flowing from the holes n will flow down these arched troughs upon each side, and being thus thinly spread out and retarded in their movement will evaporate and produce a body of gas which is by the divergence of the troughs distributed throughout the chamber. They serve also to communicate the explosion along the trough to the arches O. In addition to this the tube M has holes made through it at intervals, as shown at N, and these holes discharge the material into the trough L, where it may flow from end to end of the trough, and the evaporation of this adds to the amount of vapor otherwise produced.

In order to supply the tube M, I have shown a small tube M', connecting with the discharge-tube of the measuring-chamber B' at a point below the valve D of said chamber, and this tube opens into or forms a continuation with the tube M previously described. In order to direct the material when it is a fluid into this tube M', I have shown a cock Q in the discharge-pipe below the chamber B' and below the upper end of the pipe M'. This cock is opened to allow a free discharge of material when any material is used, as previously described, which it is desired to direct into the depressed chamber F; but when the material is to be distributed through the pipe M and the trough L this cock Q is closed, thus diverting the flow of the material through the pipe M M'. A cock M² serves to close this last pipe when the material is to pass directly through the cock Q.

If preferred, a continuous arch, Fig. 4, may be substituted for the separate arched troughs and the surface roughened or indented so that the fluid will be distributed over the surface, the operation being essentially the same.

Having thus described my invention, what I claim as new, and desire to secure by Letters Patent, is—

1. In a vacuum suction apparatus, the combination of a tank having inlet and outlet openings, a source of supply for gas-producing material, a measuring-chamber intermediate between the source of supply and the vacuum-tank and adapted to discharge the gas-producing material into said tank, a valve-stem extending vertically therethrough having valves fixed to it within the measuring-chamber, with such relation to each other that when one valve is closed, the other is opened, a spring by which the lower valve is normally closed and a lever by which the upper valve may be closed and the lower one opened, and means for producing an explosion in the tank to create a vacuum therein.

2. In a vacuum suction apparatus, the combination of a tank having inlet and outlet openings, a source of supply for gas-producing material, a measuring-chamber intermediate between the source of supply and the tank and connecting with the interior of the latter, a valve-stem having valves fixed to it within the measuring-chamber at such a distance apart that one valve is opened when the other is closed, a spring normally pressing upon the lower valve to retain it in a closed position, and an inclosing cylinder therefor, the top of said cylinder being closed by the upper valve when opened and the bottom when the lower valve is opened, mechanism whereby the valve-stem may be moved to reverse the normal condition of the valves and allow the charge to be delivered from the chamber, and means for producing an explosion in the tank to create a vacuum therein.

3. In an apparatus of the character described, a main tank having water inlet and outlet openings, a source of supply for gas-producing material, with an interposed valve-controlled measuring-chamber, a water-chamber in the lower part of the main tank, an inclined tube having a trough formed upon its upper side, a receiving-cup near the upper end of said trough into which the measuring-chamber discharges, means for tilting said cup to allow its contents to flow down the trough and be discharged into the chamber at the bottom of the tank, and means for causing an explosion in the tank for creating a vacuum therein.

4. In an apparatus of the character described, a main tank having a water inlet and outlet and having a depressed water-chamber in the bottom, an inclined tube having a funnel-shaped mouth at the bottom, a second funnel surrounding it at a point intermediate between the top and bottom, and a trough fixed upon the upper side of the tube passing through the funnels with the lower end discharging into the chamber beneath the lower funnel, a tilting cup pivoted at the upper end of the trough, a source of supply for gas-producing material, a charge-measuring chamber intermediate between the source of supply and the tank and a conductor by which the charge is delivered into the cup and a lever or means for tilting the cup to allow its contents to pass down the trough into the chamber of the main tank, and means for producing an explosion in said tank.

5. In an apparatus of the character described, a main tank with the depressed chamber and water inlet and outlet, means for supplying a gas-producing material to said tank, an inclined tube having a funnel-shaped mouth diverging above the chamber, a second funnel surrounding the tube, between its upper and lower ends, holes made through the sides of the tube within said second funnel whereby the gas produced and rising through the tube is partially diverted and distributed through the tank, means for exploding the gas within the tank.

6. In an apparatus of the character described, a main tank with water inlet and outlet, a supply and a measuring chamber for gas-producing material, an inclined tube fixed within the tank having a trough on its upper side and a receiving-cup into which the measuring-chamber discharges, with means for distributing the gas arising within the tube, an ignition-chamber into which the upper end of the tube opens, means for igniting the gas and a valve whereby the escape of gas from the tube into the ignition-chamber is controlled and regulated.

7. In an apparatus of the character described, a main tank having a water inlet and outlet, a source of supply for gas-producing material, a measuring-chamber intermediate between it and the main tank, valves controlling the ingress and egress of the material to said chamber, a pipe extending through the upper part of the main tank and having discharge-tubes at intervals in its length, arched diverging distributing-troughs situated beneath these discharge-pipes to receive the flow therefrom, said troughs having corrugated bottoms substantially as described, and means for producing an explosion within the tank.

8. In an apparatus of the character described, a main tank having a water inlet and outlet, a source of supply for gas-producing material, a measuring-chamber with controlling-valves intermediate between the supply and the tank, a pipe through which the material from the measuring-chamber is delivered through the upper part of the tank, a trough within which said pipe extends, holes made in the pipe at intervals whereby the material may pass into the trough to produce vapor throughout the length of the tank, and means for igniting said vapor.

9. In an apparatus of the character described, a main tank having a water inlet and outlet, a source of supply for gas-producing material, a valve-controlled measuring-chamber interposed between the two, with means for discharging and directing the gas-producing substance and distributing it within the tank, means for igniting the gas, outwardly-opening valves in the upper part of the chamber, and levers connecting therewith whereby the valves may be simultaneously opened.

LUDWIG L. GROSS.

Witnesses:
S. H. NOURSE,
GEO. H. STRONG.